United States Patent
Seko

(10) Patent No.: US 8,282,372 B2
(45) Date of Patent: Oct. 9, 2012

(54) APPARATUS AND METHOD FOR VULCANIZING PNEUMATIC TIRE

(75) Inventor: Akikazu Seko, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 98 days.

(21) Appl. No.: 12/863,066

(22) PCT Filed: Feb. 18, 2009

(86) PCT No.: PCT/JP2009/052753
§ 371 (c)(1), (2), (4) Date: Jul. 15, 2010

(87) PCT Pub. No.: WO2009/107526
PCT Pub. Date: Sep. 3, 2009

(65) Prior Publication Data
US 2011/0042852 A1 Feb. 24, 2011

(30) Foreign Application Priority Data
Feb. 25, 2008 (JP) ................................ 2008-042926

(51) Int. Cl.
B29D 29/00 (2006.01)
B29C 35/00 (2006.01)
B60C 9/00 (2006.01)

(52) U.S. Cl. .......... 425/46; 425/28.1; 425/34.1; 425/35; 425/36; 425/39; 425/43; 425/47; 249/67; 249/68; 156/110.1; 156/394.1; 264/326

(58) Field of Classification Search ............... 156/394.1, 156/110.1; 425/28.1, 34.1, 35, 36, 39, 43, 425/47, 46; 249/67, 68; 264/326
See application file for complete search history.

(56) References Cited

U.S. PATENT DOCUMENTS
7,976,299 B2 * 7/2011 Sano et al. ...................... 425/46
2004/0046286 A1 * 3/2004 Seko et al. .................... 264/326

FOREIGN PATENT DOCUMENTS
JP 04-348915 A 12/1992
JP 2007-253400 A 10/2007

\* cited by examiner

*Primary Examiner* — Christina Johnson
*Assistant Examiner* — Atul P Khare
(74) *Attorney, Agent, or Firm* — Carrier Blackman & Associates, P.C.; William D. Blackman; Joseph P. Carrier

(57) ABSTRACT

Provided are a apparatus and a method for vulcanizing a pneumatic tire, where are capable of: smoothly releasing a vulcanized pneumatic tire from multiple sectors separated from one another in a circumferential direction in each of an upper mold and a lower mold; and thereby lightening load on each mold. In addition to springs for biasing the sectors to always move into a smaller diameter, respectively, pushpins for moving the sectors into larger and smaller diameters are actuated by the respective cylinder rods of drive cylinders, and thereby the movements of the individual sectors into the larger and smaller diameters are controlled. Accordingly, even though the sectors would otherwise move abruptly into the smaller diameter due to biasing forces of the springs after the vulcanized tire is released from the sectors at the larger diameter, a radius-reducing movement speed of the sectors is control led by the cylinder rods in contact with rear ends of the push pins.

2 Claims, 10 Drawing Sheets

APPARATUS AND METHOD FOR VULCANIZING PNEUMATIC TIRE

TECHNICAL FIELD

The present invention relates to a pneumatic tire vulcanizing apparatus including multiple sectors which are separated from one another in a circumferential direction in each of upper and lower molds, and to a pneumatic tire vulcanizing method using the same. More specifically, the present invention relates to a pneumatic tire vulcanizing apparatus and method which are capable of smoothly releasing a vulcanized pneumatic tire from the sectors, and thereby of lightening load on the mold set.

BACKGROUND ART

A apparatus known as a pneumatic tire vulcanizing apparatus includes upper and lower molds separated from each other upward and downward, each of the molds including multiple sectors separated from one another in a circumferential direction (see Patent Document 1, for example). In such a vulcanizing apparatus, each of the upper mold and the lower mold has a tapered surface formed inclining outward toward mating surfaces of the upper and lower molds; and the sectors slide up and down along the tapered surface, and thus move into a larger diameter and a smaller diameter. In addition, the sectors are always biased by their respective springs to move into the smaller diameter, and are configured to automatically move into the smaller diameter by biasing forces of the respective springs once a vulcanized tire is released from the sectors at the larger diameter. The vulcanizing apparatus provided with these molds has the following problems. First, the vulcanized tire cannot be smoothly released from the sectors in a way that the release of the vulcanized tire is partially delayed, or that protruding portions of the molding surfaces of some of the sectors get stuck in corresponding grooves of the tire. That is because frictional resistance generated when the sectors move into the larger diameter and the smaller diameter is not uniform among the sectors. Second, load on the molds is large. That is because: immediately after the vulcanized tire is released from the sectors, the biasing forces of the springs cause the sectors to move abruptly into the smaller diameter, and thereby to collide with other portions of the mold; or an excessive force is applied to the protruding portions of the molding surfaces of the sectors when the protruding portions get stuck in the grooves of the tire. Patent Document 1: Japanese patent application Kokai publication No. Hei 4-348915

DISCLOSURE OF THE INVENTION

Problems to be Solved by the Invention

An object of the present invention is to provide a pneumatic tire vulcanizing apparatus and method which are capable of: releasing a vulcanized tire to be smoothly from multiple sectors which are separated from one another in a circumferential direction in each of its upper and lower molds; and thereby of lightening load on the molds.

Means for Solving the Problems

For the purpose of attaining the object, a pneumatic tire vulcanizing apparatus according to the present invention is that in which: each of its upper and lower molds has multiple sectors which are separated from one another in a circumferential direction; the sectors are configured in that the sectors are capable of moving into a larger diameter and a smaller diameter by sliding up and down along a tapered surface which inclines outward toward the mating surfaces of the upper and lower molds; and the sectors are provided with springs for biasing the sectors so as to always move the sectors into the smaller diameter, respectively. The vulcanizing apparatus is characterized by including: push pins for moving the sectors into the larger diameter and the smaller diameter by sliding the sectors up and down, respectively; and drive cylinders for actuating the respective push pins.

In this respect, the vulcanizing apparatus may have a configuration in which: the push pins are provided in each of the upper mold and the lower mold; the drive cylinders are provided outside each of the upper mold and the lower mold; and the push pins and the corresponding drive cylinders are respectively separated from each other.

A pneumatic tire vulcanizing method according to the present invention is that in which: multiple sectors separated from one another in a circumferential direction, which are provided in each of the upper mold and the lower mold, are made capable of moving in the larger and smaller diameters by sliding up and down along the tapered surface inclining outward toward mating surfaces of the upper and lower molds; the sectors are biased by the respective springs to always move into the smaller diameter; a green tire, which is placed inside the sectors having been moved into the smaller diameter by clamping the upper mold and the lower mold together, is vulcanized; the vulcanized tire is released from the sectors by opening the upper mold and the lower mold, and thus by moving the sectors into the larger diameter; and thereafter, the sectors are moved into the smaller diameter by biasing forces of the springs, respectively. The vulcanizing method is characterized in that: when the green tire is to be placed inside the sectors, the upper mold and the lower mold are opened, and the sectors are moved into the larger diameter against the biasing forces of the springs by using the push pins actuated by the drive cylinders, as well as the green tire is placed inside the sectors which are in this state; thereafter, the upper mold and the lower mold are clamped together with the upper sectors and the corresponding lower sectors being in contact with each other, and the green tire is vulcanized with the sectors being moved into the smaller diameter; when the vulcanized tire is to be released from the sectors, the upper mold and the lower mold are opened, and the sectors are moved into the larger diameter against the biasing forces of the springs by using the push pins actuated by the drive cylinders with the upper sectors and the corresponding lower sectors being in contact with each other, as well as thereby the vulcanized tire is released from the sectors; and thereafter, a radius-reduced movement speed, at which each sector moves into the smaller diameter by the biasing force of the corresponding spring, is controlled by the corresponding pushpin actuated by the corresponding drive cylinder.

In this respect, the vulcanizing method may be achieved by: preparing multiple pairs of the upper mold and the lower mold each having the push pins which are provided therein; providing the drive cylinders in the vulcanizing apparatus while being separated from the multiple pairs of the upper mold and the lower mold; selecting a pair of the upper mold and the lower mold, which correspond to a tire to be vulcanized, from the multiple pairs of the upper mold and the lower mold; and attaching the selected pair of the upper mold and the lower mold to the vulcanizing apparatus in such a manner that the push pins provided in each of the upper mold and the lower mold are brought into contact with the driver cylinders.

Effects of the Invention

The present invention enables the vulcanized tire to be securely and smoothly released from the multiple sectors which are provided to each of the upper and lower molds, and which are configured to move into the larger and smaller diameters. That is because: the multiple sectors include not only the springs for biasing the multiple sectors to always move into the smaller diameter, but also the push pins for moving the sectors into the larger and smaller diameters; and the movement of the individual sectors into the larger and smaller diameters can be controlled by the push pins actuated by the drive cylinders. Accordingly, the present invention makes no excessive force be applied to protruding portions or the like of the molding surfaces of the sectors. In addition, the present invention is capable of preventing the sectors from colliding with other portions of the molds. That is because a speed of the movement of the sectors into the smaller diameter is controlled by the push pins even though the sectors would otherwise move abruptly into the smaller diameter due to the biasing forces of the springs upon release of the vulcanized tire from the sectors. Thus, the present invention is capable of lightening load on each mold.

Figure 1:
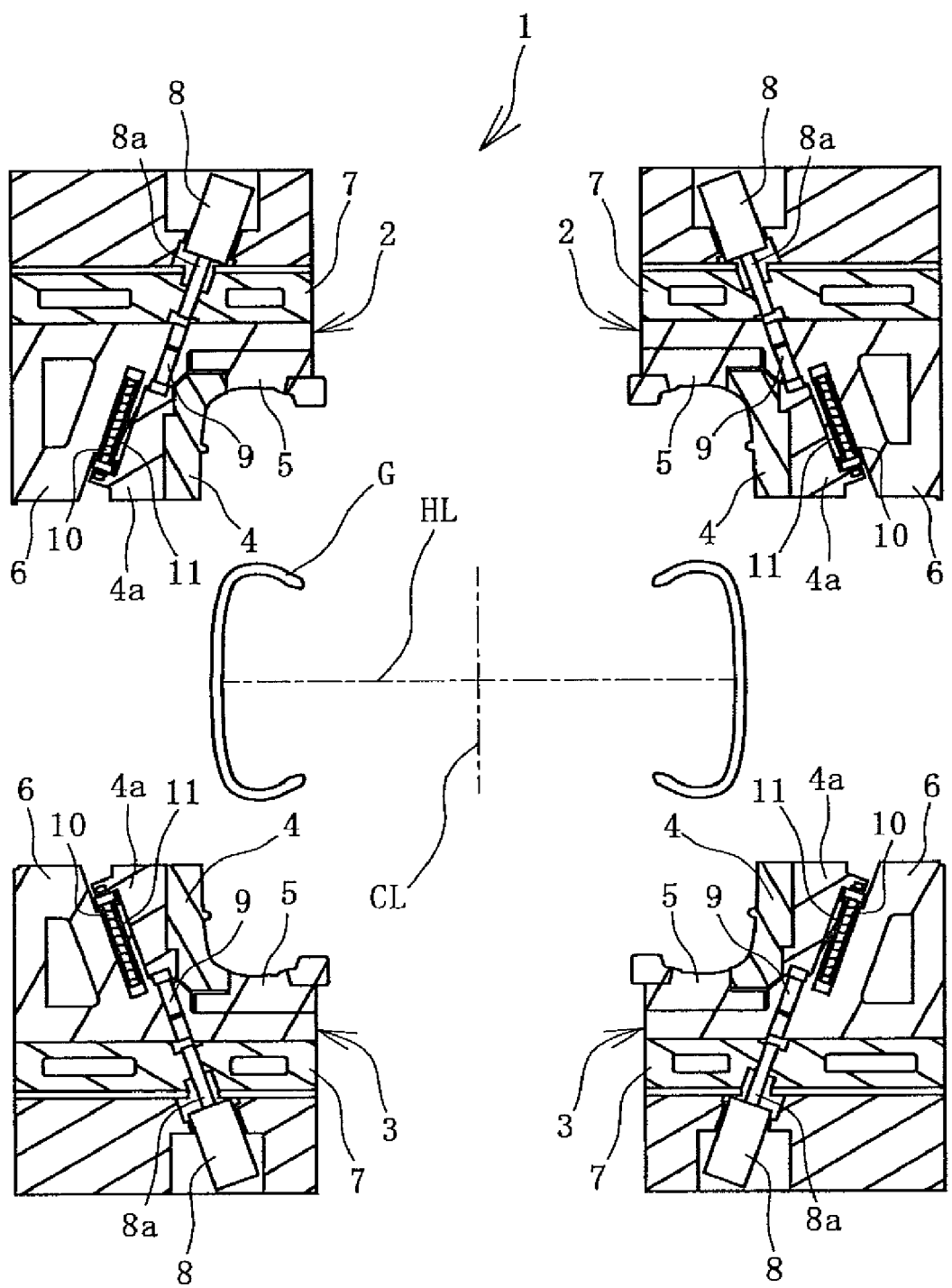
FIG. 1 is a vertical cross-sectional view illustrating a pneumatic tire vulcanizing apparatus of the present invention.

EXPLANATION OF REFERENCE NUMERALS 1 vulcanizing apparatus
2 upper mold
3 lower mold
4 sector
4a back segment
5 side plate
6 guide block
7 platen
8 drive cylinder
8a cylinder rod
9 push pin
10 guide rod
11 spring
12 sealant
G green tire
T vulcanized tire

BEST MODES FOR CARRYING OUT THE INVENTION

Hereinbelow, a pneumatic tire vulcanizing apparatus and a pneumatic tire vulcanizing method according to the present invention will be described based on an embodiment which is illustrated in the drawings. Note that a line segment CL shown in FIGS. 1 to 10 denotes a tire axis of a green tire G (vulcanized tire T after a vulcanizing process), while a line segment HL shown in FIGS. 1 to 10 denotes a center line in a tire width direction. In addition, the green tire G (vulcanized tire T after the vulcanizing process) moves upward and downward while being held by a central mechanism. The central mechanism, however, is omitted in FIGS. 1 to 10.

Figure 2:
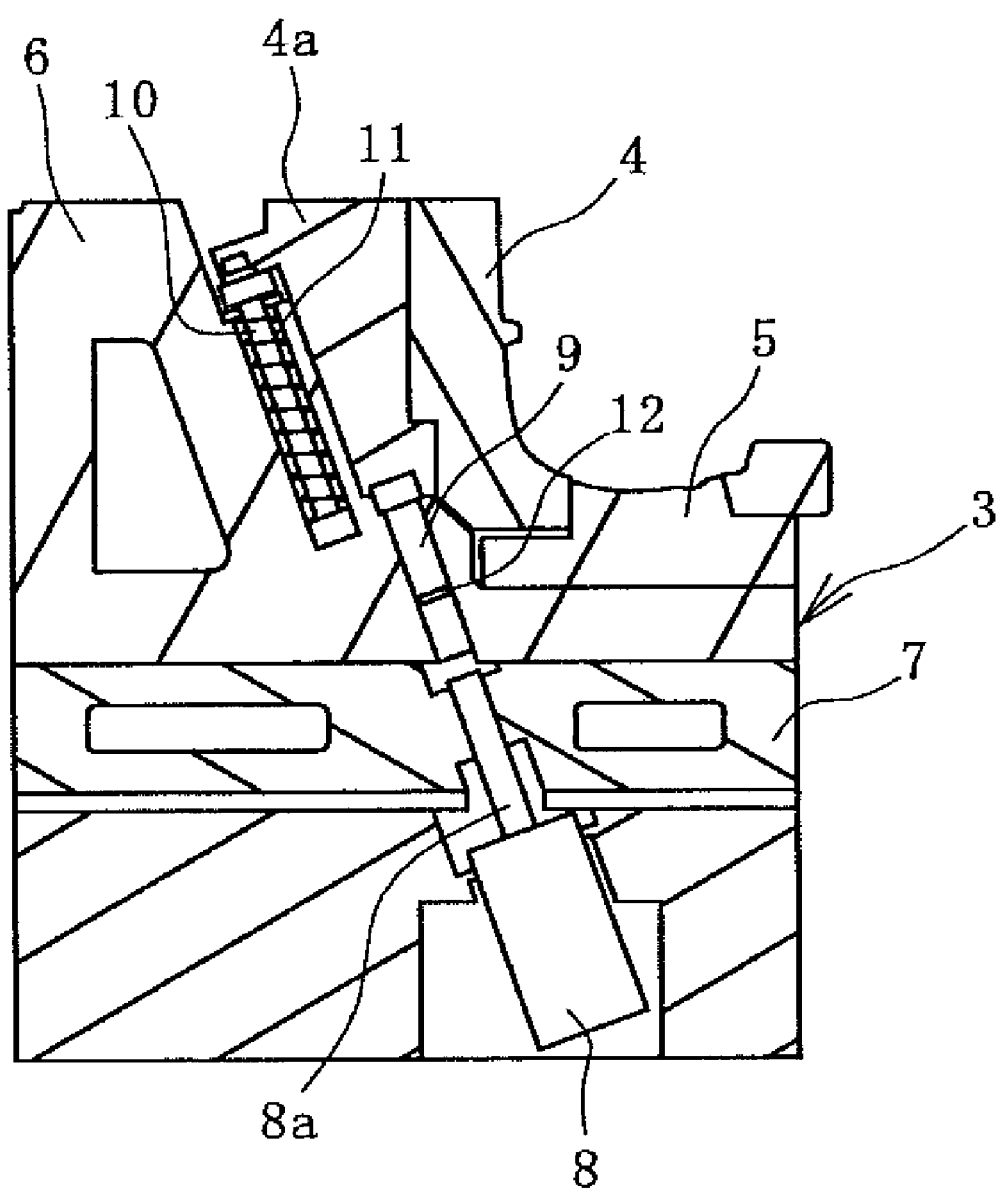
FIG. 2 is a partially enlarged view of the vulcanizing apparatus in FIG. 1.
Figure 3:
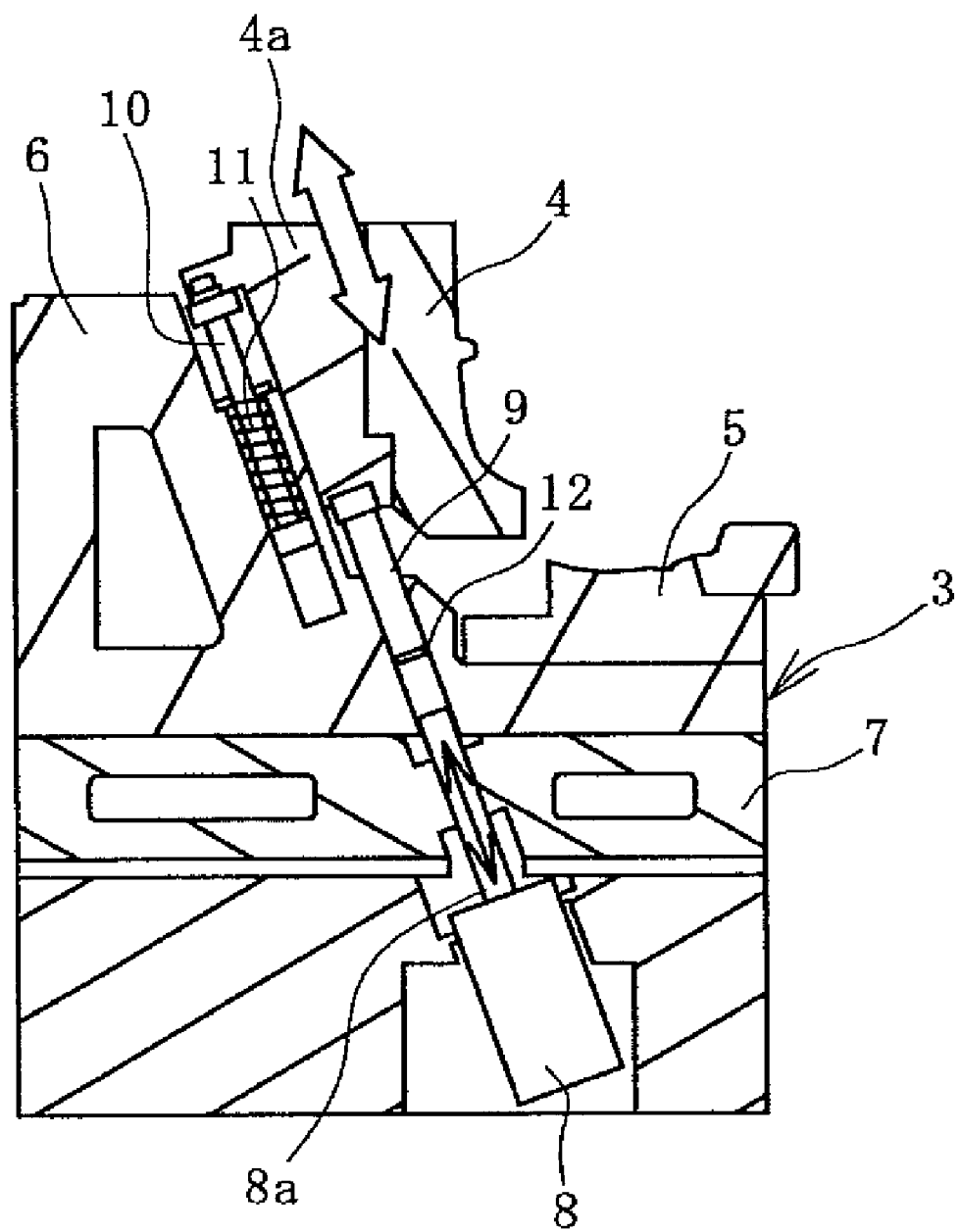
FIG. 3 is an explanatory view illustrating a movement of a sector in FIG. 2.

As illustrated in FIGS. 1 to 3, a pneumatic tire vulcanizing apparatus 1 (hereinafter referred to as the vulcanizing apparatus 1) of the present invention includes molds that can be separated upward and downward into an upper mold 2 and a lower mold 3. The upper mold 2 and the lower mold 3 are detachably attached to their respective platens 7 each having a flow path of a heating medium. Since the upper mold 2 and the lower mold 3 basically have the same configuration, the configuration of the lower mold 3 is representatively illustrated in FIGS. 2 and 3.

In the upper mold, drive cylinders 8 are provided above the platen 7 to which the upper mold 2 is attached. A cylinder rod 8a of each drive cylinder 8 is configured to penetrate through the platen 7, as well as to move forward to and backward from the upper mold 2. In the lower mold, the other drive cylinders 8 are provided below the other platen 7 to which the lower mold 3 is attached. The cylinder rod 8a of each drive cylinder 8 is configured to penetrate through the platen 7, as well as to move forward to and backward from the lower mold 3. The movements of the drive cylinders 8 (forward and backward movements of the cylinder rods 8a) are controlled by a controller, respectively.

Each of the upper mold 2 and the lower mold 3 includes an attachable/detachable side plate 5, and multiple sectors 4 that are separated in a circumferential direction. The circular side plate 5 mainly molds and vulcanizes a side portion of the green tire G. The multiple sectors 4 separated from one another in the circumferential direction are assembled together in a circular arrangement, and mainly molds and vulcanizes a tread portion of the green tire G. To this end, protruding portions for forming tire grooves are provided on a top surface of each of the sectors 4 serving as a tire molding surface.

Each of the upper mold 2 and the lower mold 3 includes a guide block 6 having a tapered surface that inclines outward toward mating surfaces of the upper mold 2 and the lower mold 3. A back segment 4a is attached to a back surface (outward surface) of each sector 4. A guide rod 10 extending along the tapered surface of the guide block 6 is provided between facing surfaces of the back segment 4a and the guide block 6. A top end portion of the guide rod 10 is fixed to the back segment 4a, while a main body portion of the guide rod 10 is inserted into a guide hole formed in the guide block 6. A spring 11 wound outside the guide rod 10 is interposed between a rear end portion of the guide rod 10 and an entrance of the guide hole. The facing surfaces of the guide block 6 and the back segment 4a have a configuration in which: the facing surfaces are formed in a conical shape; and the facing surfaces are slidably engaged with each other by using convexo-concave engagement portions, for example.

A top end portion of a push pin 9 extending along the tapered surface of the guide block 6 comes in contact with the back segment 4a. A larger-diameter portion is formed in the top end portion of the push pin 9 so that the top end portion of the push pin 9 has a stepped shape, thereby preventing the push pin 9 from coming off downward during the changing of molds. A sealant 12 is fitted into an intermediate position in a longitudinal direction of the push pin 9. A top end of the cylinder rod 8a moving forward and backward along the tapered surface of the guide block 6 comes in contact with a rear end of the push pin 9.

As described above, each back segment 4a and the corresponding sector 4 are provided to be slidable up and down along the tapered surface of the guide block 6, as illustrated in FIG. 3. The back segments 4a and the sectors 4 are configured to move the sectors 4 into the larger diameter to be open when sliding toward the mating surfaces of the upper mold 2 and the lower mold 3, and to move the sectors 4 into the smaller diameter to be assembled together in a circular arrangement when sliding away from the mating surfaces of the upper mold 2 and the lower mold 3.

The spring 11 wound around each guide rod 10 always biases the corresponding sector 4 to move in a direction away from the mating surfaces of the upper mold 2 and the lower mold 3, i.e., to move into a smaller diameter. Accordingly, the movement of the sectors 4 into the larger diameter is achieved by: moving the cylinder rods 8a forward so that the top ends of the cylinder rods 8a push the rear end of the push pins 9 provided in the upper molds 2 and the lower molds 3; and thereby moving the sectors 4 into the larger diameter against the biasing forces of the springs 11, respectively. On the other hand, when the sectors 4 are to be moved into the smaller diameter, the urging forces of the springs 11 are utilized. In this respect, the speed of the movement of speed of each sector 4 is controlled by: bringing the top end of the corresponding cylinder rod 8a into contact with the rear end of the corresponding push pin 9; and thus adjusting the backward movement speed of the cylinder rod 8a.

Next, a description will be given of a procedure of a pneumatic tire vulcanizing method using the vulcanizing apparatus 1.

First, the upper mode 2 and the lower mold 3 are opened as illustrated in FIG. 1. Here, the sectors 4 are retracted in the upper mold 2 and the lower mold 3 while being at the smaller diameter. The green tire G is placed inside the mold set while the molds are put in this condition.

Figure 4:
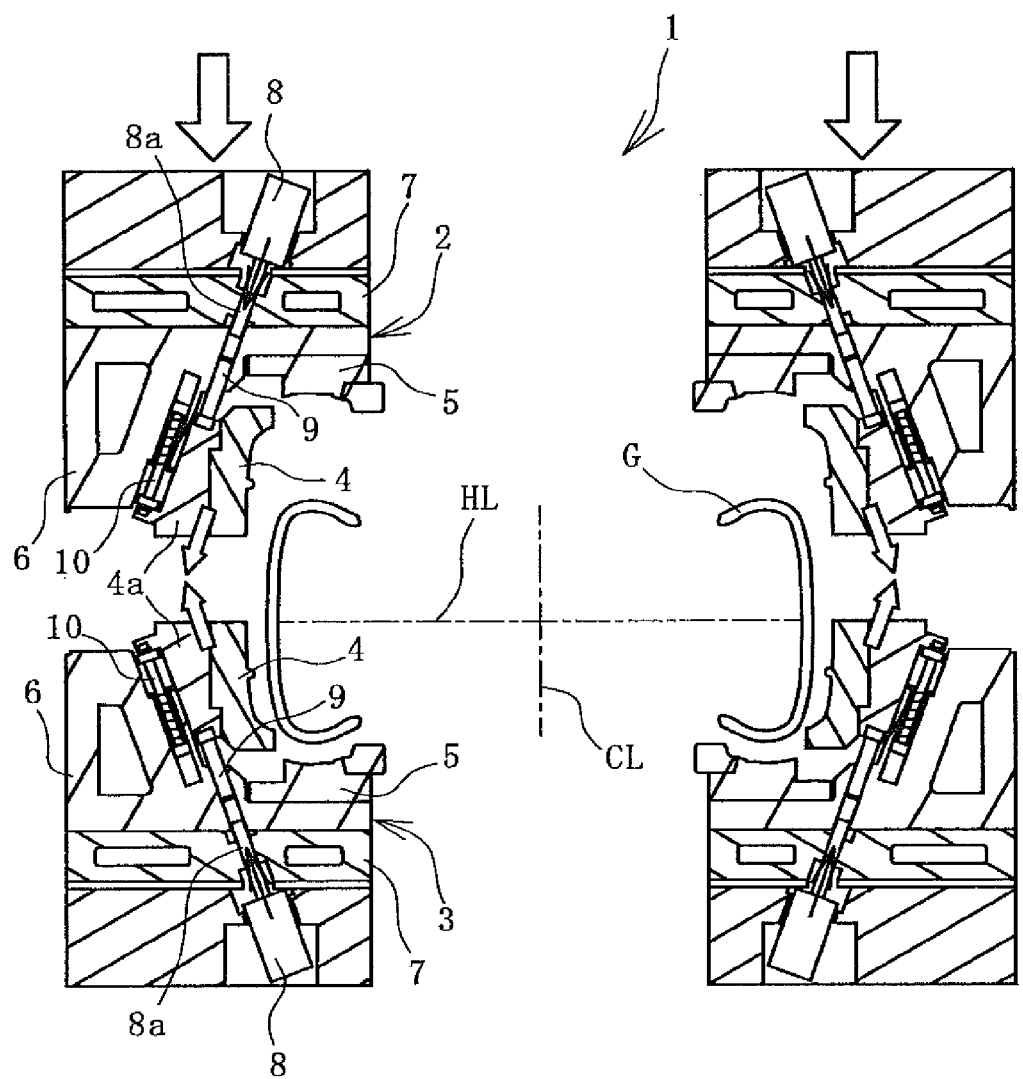
FIG. 4 is a vertical cross-sectional view illustrating a state in which an upper mold and a lower mold are started to be clamped together while sectors are moved into a larger diameter.

Second, as illustrated in FIG. 4, the cylinder rods 8a of the drive cylinders 8 are moved forward so that the sectors 4 are moved into the larger diameter against the biasing forces of the springs 11 to be open fully. The upper mold 2 and the lower mold 3 are started to be clamped together by moving the upper mold 2 downward with the green tire G being held at a mold clamping position.

Figure 5:
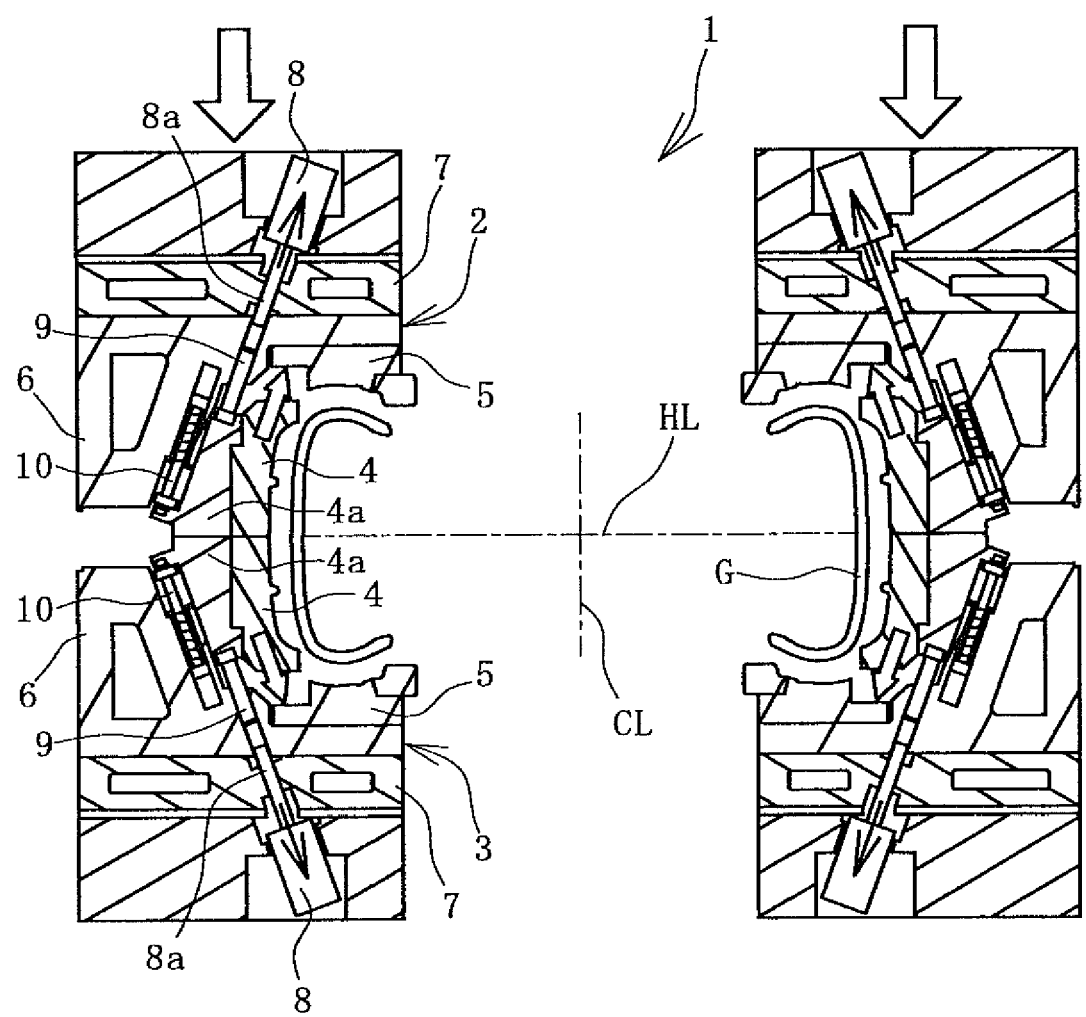
FIG. 5 is a vertical cross-sectional view illustrating a state in which the upper mold and the lower mold are clamped together while upper sectors are in contact with corresponding lower sectors.

As illustrated in FIG. 5, the corresponding upper and lower sectors 4 are brought into contact with each other by moving the upper mold 2 downward. Convexo-concave portions for positioning the corresponding upper and lower sectors 4 to each other are preferably provided on contact surfaces of the upper and lower sectors 4. After the upper and lower sectors 4 are respectively brought into contact with each other, the green tire G is moved downward in synchronization with the downward movement of the upper mold 2. Similarly, after the upper and lower sectors 4 are brought into contact with each other, the cylinder rods 8a are moved backward in synchronization with the downward movement of the upper mold 2, and thereby the sectors 4 are moved into the smaller diameter.

Figure 6:
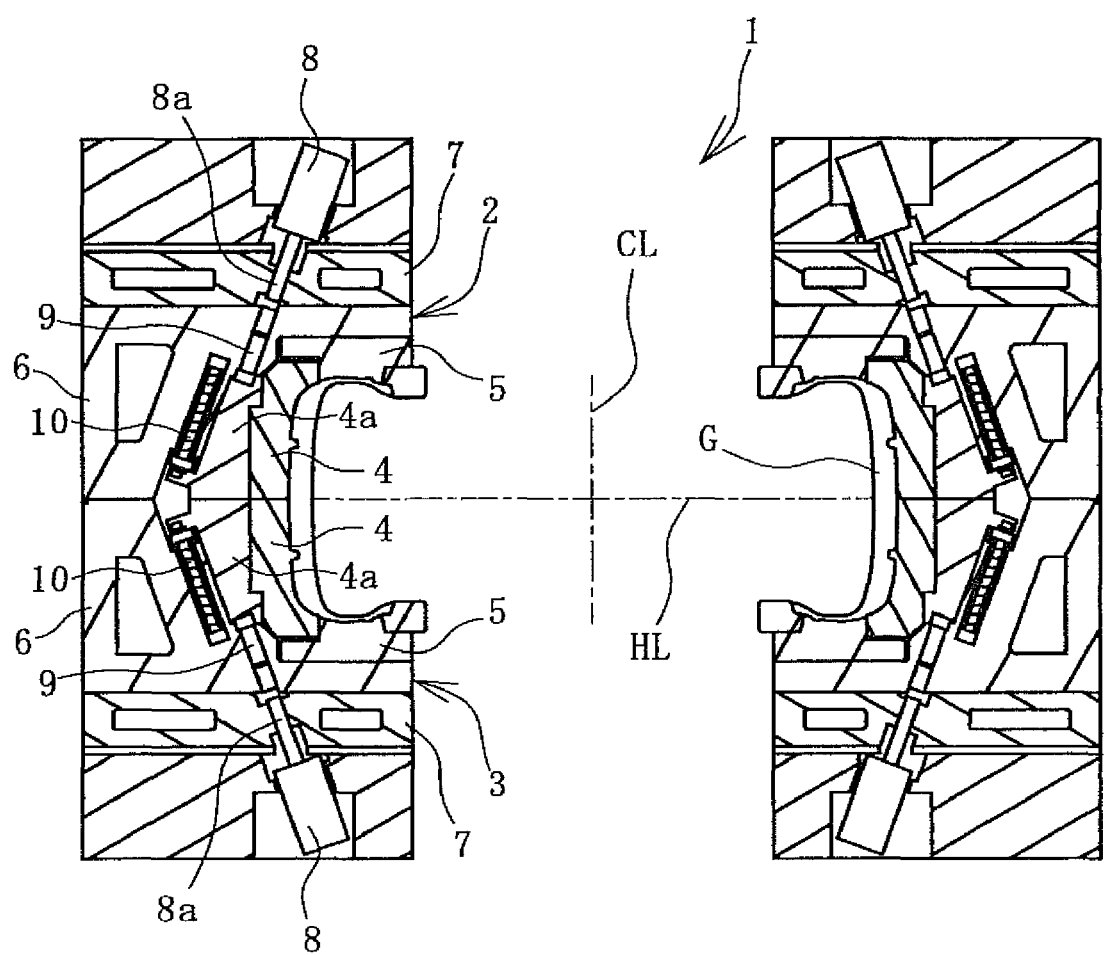
FIG. 6 is a vertical cross-sectional view illustrating a state in which a green tire is being vulcanized after the upper and lower molds are completely clamped together.

As described above, while the upper and lower sectors 4 are respectively in contact with each other, the sectors 4 are assembled together in a circular arrangement by moving the sectors 4 into the smaller diameter. Thereafter, the upper mold 2 and the lower mold 3 are brought into contact with each other at the mating surfaces thereof. Thereby, the mold clamping is completed, as illustrated in FIG. 6. With this state, the green tire G placed inside the circularly assembled sectors 4 is vulcanized at a predetermined temperature and a predetermined pressure. When the green tire G is to be vulcanized in vacuum, the upper mold 2 and the lower mold 3 need to be kept hermetically sealed by placing a sealant at appropriate positions of the upper mold 2 and the lower mold 3.

Figure 7:
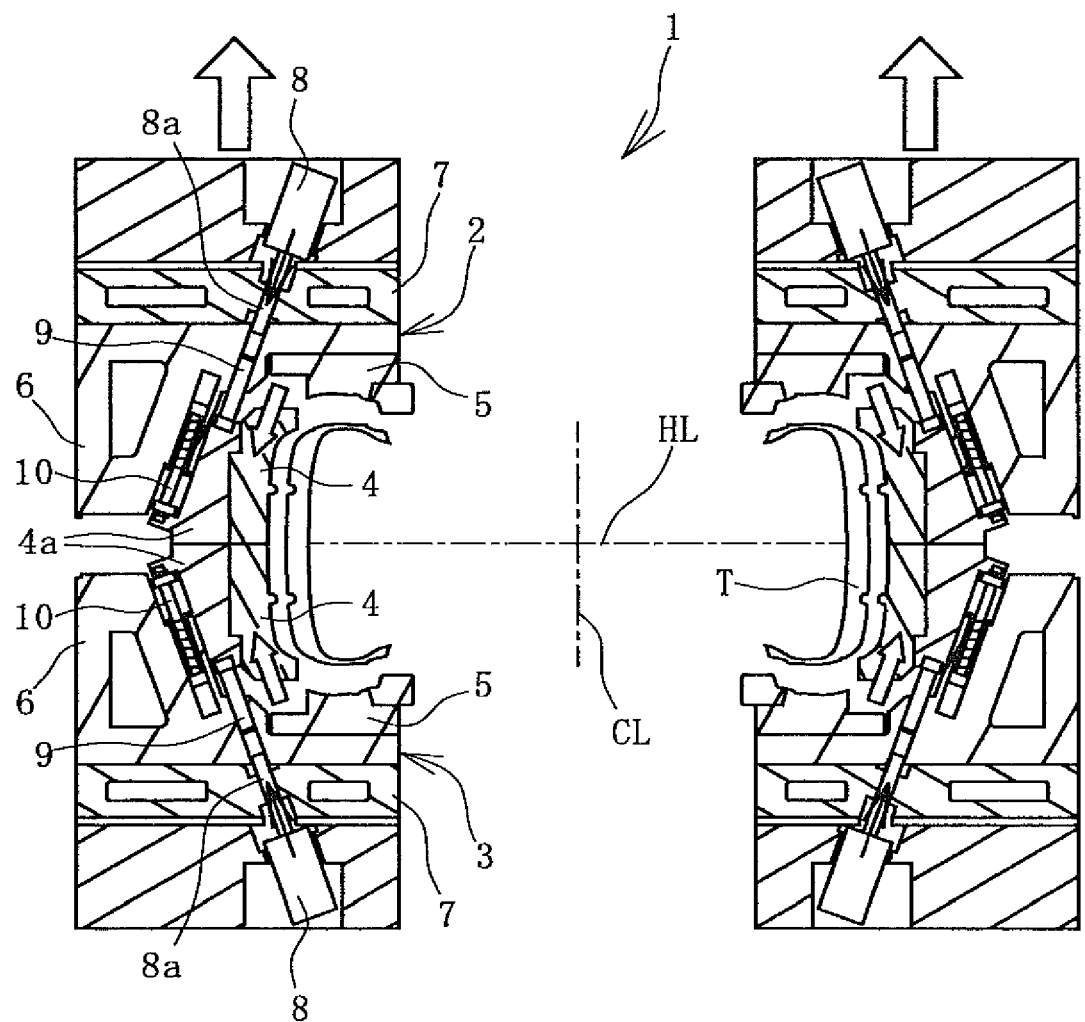
FIG. 7 is a vertical cross-sectional view illustrating a state in which the upper and lower molds are started to be opened while the sectors are moved into larger diameters after the vulcanizing of the tire.

Upon completion of the vulcanizing of the green tire G, the upper mold 2 and the lower mold 3 are started to be opened by moving the top force 2 upward, and the vulcanized tire T is moved upward, as illustrated in FIG. 7. In synchronization with the upward movement of the vulcanized tire T, the sectors 4 are moved into the larger diameter against the urging forces of the springs 11 to be open fully while the corresponding upper and lower sectors are in contact with each other by moving the cylinder rods 8a forward. Thereby, the vulcanized tire T is released from surfaces of the sectors 4 and the side plates 5.

Figure 8:
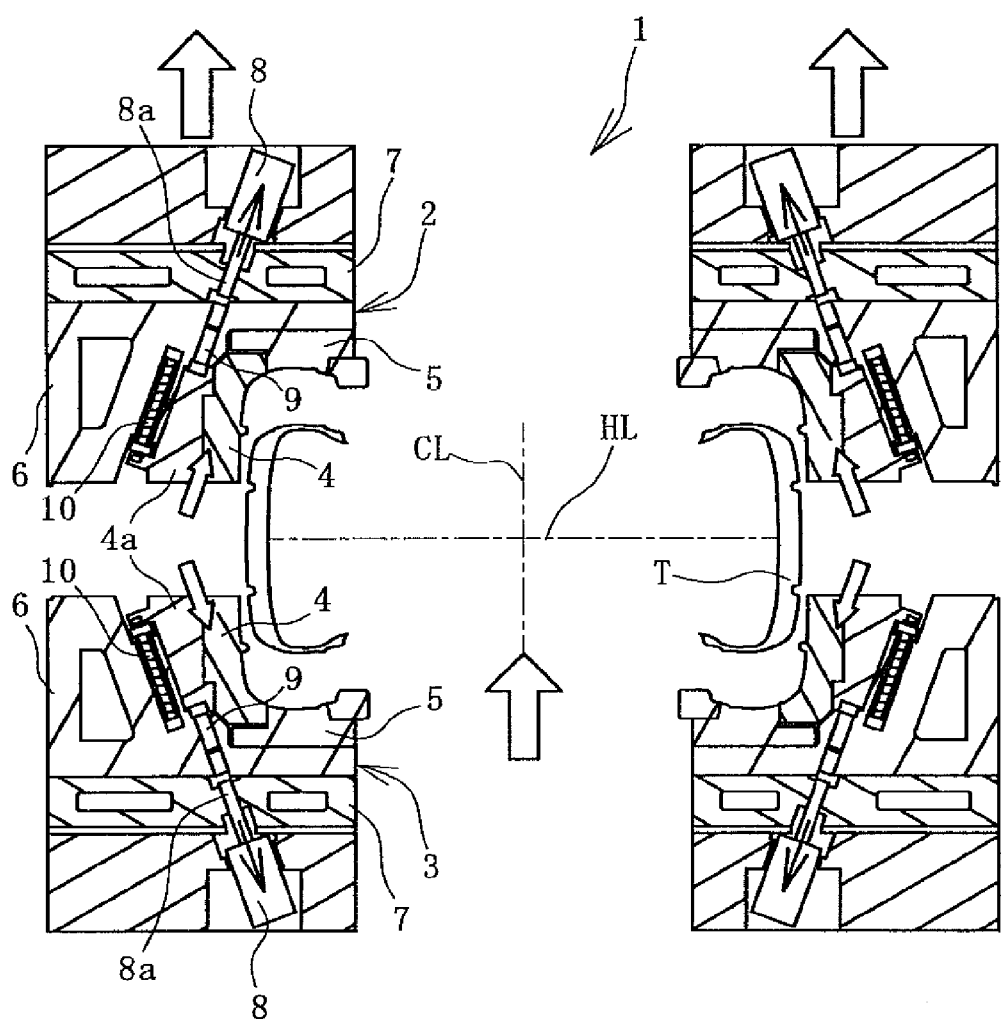
FIG. 8 is a vertical cross-sectional view illustrating a state in which the upper mold shown in FIG. 7 is further moved upward while the sectors are moved into a smaller diameter.

Next, the upper mold 2 is further moved upward, and the vulcanized tire T is moved upward, as illustrated in FIG. 8. Here, the sectors 4 having moved into the larger diameter are ready to move into the smaller diameter by the biasing forces of the springs 11. However, the cylinder rods 8a in contact with the push pins 9 control the speeds of the movements of the sectors 4 into the smaller diameter in order that the cylinder rods 8a regulate the speeds, respectively. Accordingly, the sectors 4 slowly move into the smaller diameter, and never collide with other portions of the mold set such as the side plates 5. Thereby, load on each mold is lightened.

Figure 9:
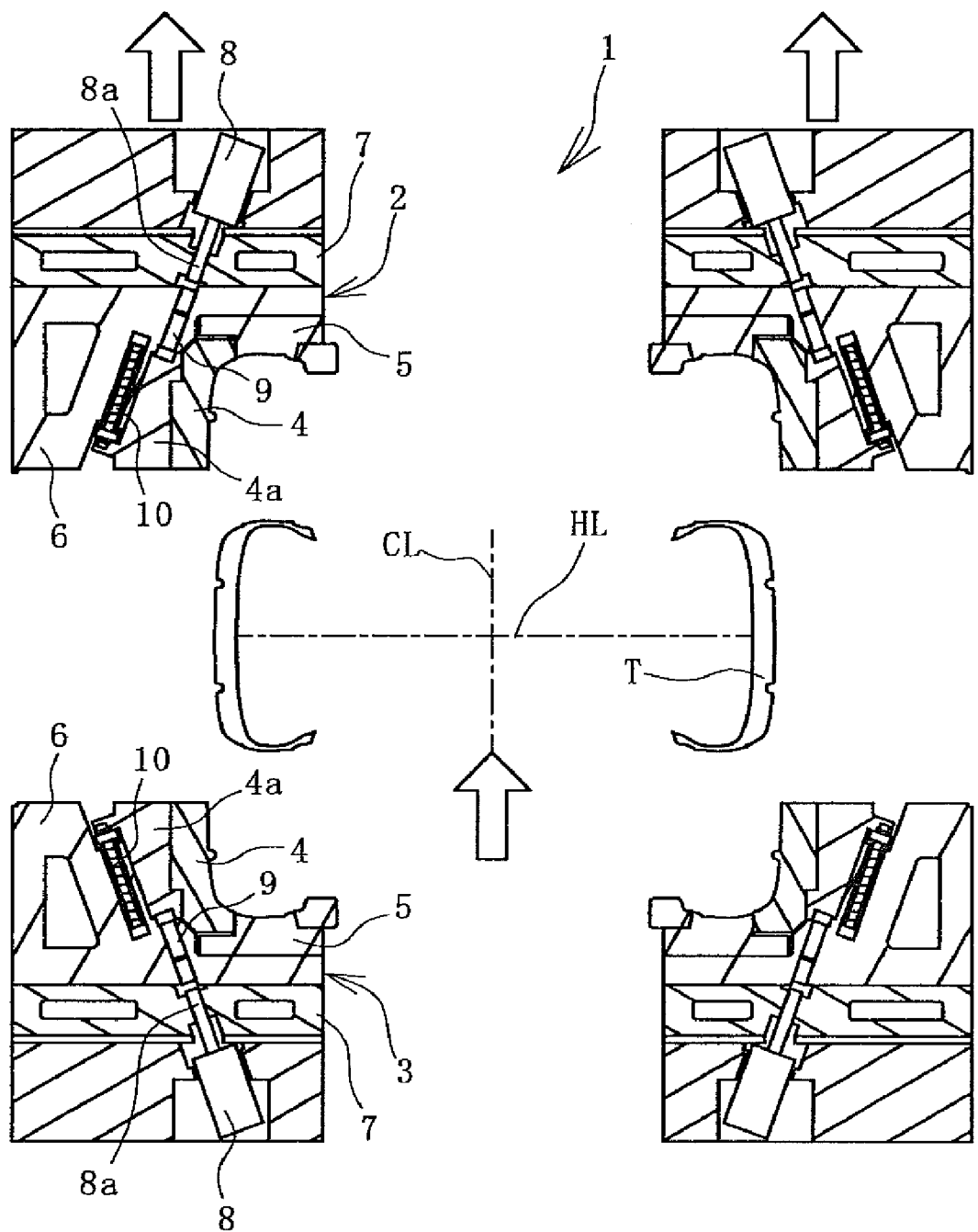
FIG. 9 is a vertical cross-sectional view illustrating a state in which the vulcanized tire is removed from the upper and lower molds which have been opened.
Figure 10:
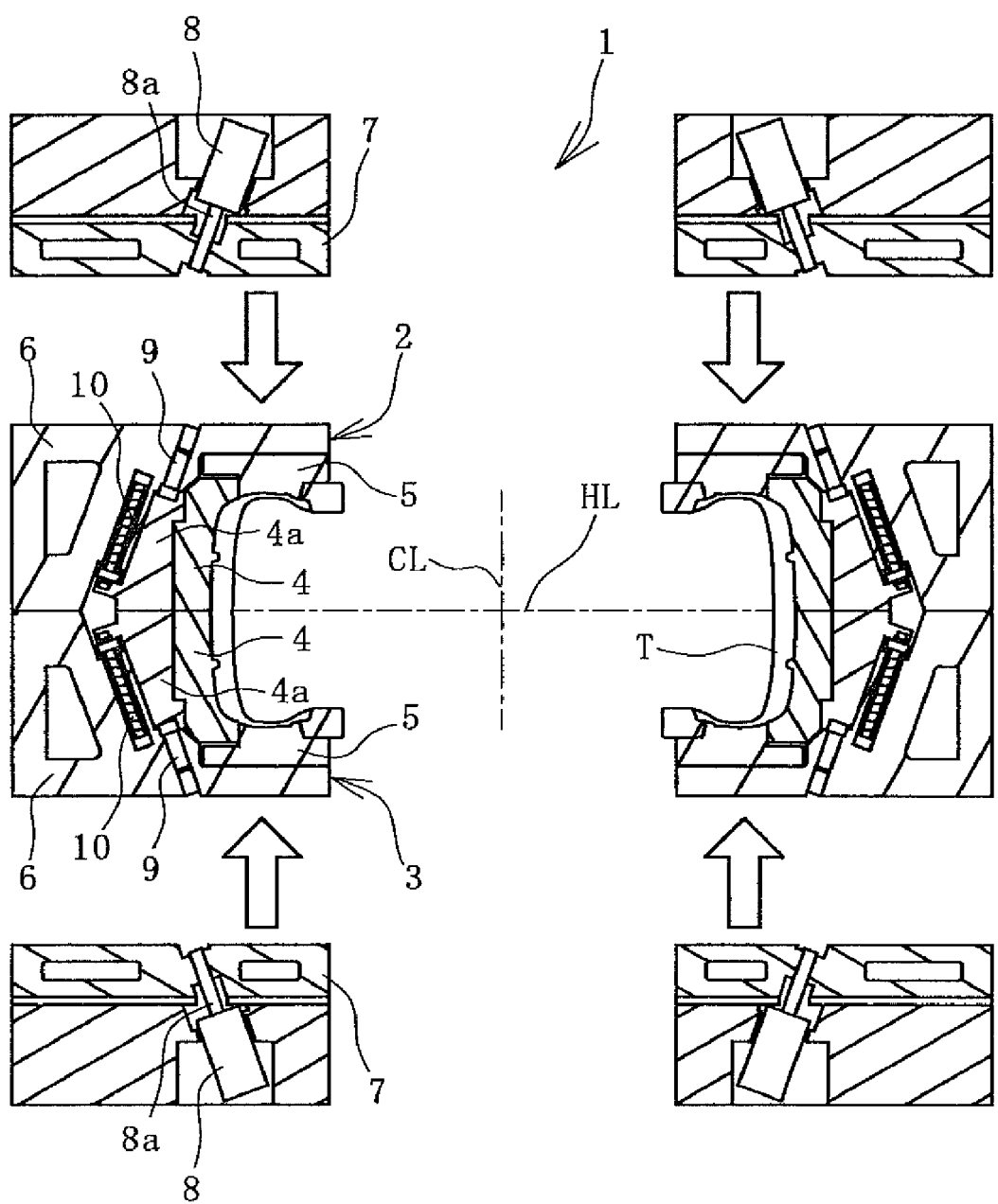
FIG. 10 is a vertical cross-sectional view illustrating a state in which the upper and lower molds are removed from the vulcanizing apparatus.

Subsequently, as illustrated in FIG. 9, the upper mold 2 is further moved upward, and the sectors 4 are retracted in the upper mold 2 and the lower mold 3 while being at the smaller diameter, so that the mold opening is completed. With this state, the vulcanized tire T is removed from the inside of the mold set.

As described above, ac cording to the pre sent invention, the movement of the sectors 4 into the larger and smaller diameters is controlled by actuating the pushpins 9 using the cylinder rods 8a of the drive cylinders 8. Accordingly, even when frictional resistance is not uniform among the sectors 4 when the sectors 4 move into the larger and smaller diameter, the movement of the sectors 4 into the larger and smaller diameters can be achieved reliably. For this reason, the vulcanized tire T is capable of being smoothly released from the sectors 4, because: the release of the vulcanized tire T never delays partially; and during the release of the vulcanized tire T, the protruding portions of the molding surface of each sector 4 can be prevented from getting stuck in the corresponding grooves formed in the vulcanized tire T. This makes it possible to avoid an excessive force being applied to the protruding portions of the molding surface of each sector 4, and thereby lightens load on the mold set.

In this embodiment, the push pins 9 are provided in each of the upper mold 2 and the lower mold 3; the drive cylinders 8 are provided outside each of the upper mold 2 and the lower mold 3 (in the vulcanizing apparatus 1); and the push pins 9 and the cylinder rods 8a of the corresponding drive cylinders 8 are separated from each other. Accordingly, only the upper mold 2 and the lower mold 3 can be replaced with new ones while the drive cylinders 8 are left in the vulcanizing apparatus 1.

Hence, by preparing multiple pairs of the upper mold 2 and the lower mold 3 each with the push pins 9 being provided therein, the drive cylinders 8 provided in the vulcanizing apparatus 1 can be shared by the multiple pairs of the upper mold 2 and the lower mold 3.

To vulcanize the green tire G, it is sufficient to select a pair of the upper mold 2 and the lower mold 3, which corresponds to a tire to be vulcanized, from the multiple pairs of the upper mold 2 and the lower mold 3, and to attach the selected pair of the upper mold 2 and the lower mold 3 to the vulcanizing apparatus 1 in such a manner that the pushpins 9 provided in each of the upper mold 2 and the lower mold 3 comes in contact with the corresponding drive cylinders 8.

As described above, the configuration of each of the upper mold 2 and the lower mold 3 can be made simple by providing the push pins 9 in each of the upper mold 2 and the lower mold 3, and by providing the drive cylinders 8 outside each of the upper mold 2 and the lower mold 3. In response to this, the upper mold 2 and the lower mold 3 can be made lighter in weight, and the manufacturing cost thereof can be reduced.

In addition, the mold clamping of the upper mold 2 and the lower mold 3 can be performed after the sectors 4 are moved into the larger diameter and the green tire G is placed inside the sectors 4 which are fully opened. Accordingly, the ratio of the diameter of the green tire G to that of the vulcanized tire T can be made large, as compared with the conventional mold set which is configured to be separated into upper and lower molds. Thus, an excessively large stress is less likely to be produced in the green tire G during the vulcanizing process, and thereby a vulcanized tire T with more stable and consistent quality can be manufactured.

What is claimed is:

1. A pneumatic tire vulcanizing apparatus comprising an upper mold and a lower mold which is separable from the upper mold, in which each of its upper and lower molds has a plurality of sectors separable from one another in a circumferential direction, the sectors being configured to be movable into a larger diameter and a smaller diameter by sliding up and down along a tapered guide surface inclining outward toward mating surfaces of the upper and lower molds, and the sectors being provided with coil springs for biasing the sectors so as to always force the sectors into the smaller diameter, respectively, the apparatus further comprising:

push pins positioned within the lower mold and contacting back segments of each of the sectors of the lower mold for moving the sectors of the lower mold into the larger diameter and the smaller diameter by sliding the sectors of the lower mold up and down, respectively;

push pins positioned within the upper mold and contacting back segments of each of the sectors of the upper mold for moving the sectors of the upper mold into the larger diameter and the smaller diameter by sliding the sectors of the upper mold down and up, respectively; and drive cylinders positioned outside of each of the upper and lower molds and comprising cylinder rods configured to penetrate the upper and lower molds and contact rear ends of each of said push pins for actuating the respective push pins, wherein each of the push pins is provided with a corresponding one of said drive cylinders and cylinder rods, and is arranged to be substantially coaxial therewith during operation of said mold, wherein a speed of movement of the individual sectors into the larger and smaller diameters is controlled by the respective push pins actuated by the drive cylinders and cylinder rods, and wherein each of the springs, push pins, drive cylinders, and cylinder rods is parallel to the respective corresponding tapered guide surface.

2. The pneumatic tire vulcanizing apparatus according to claim 1, wherein each of said upper and lower molds comprises a plurality of unit sections, wherein each of said unit sections comprises:

a base block having an opening formed therein to receive one of said drive cylinders;

a platen disposed on a side of the base block toward a tire equatorial plane and having a through hole formed therein to receive one of said cylinder rods;

a guide block disposed on a side of the platen toward the tire equatorial plane and having said tapered guide surface thereon;

a guide rod which is inserted into a guide hole formed in the guide block proximate said guide surface and having one of said coil springs disposed therearound; and one of said back segments affixed to the guide rod and configured to move slidably along the guide surface of the guide block, the back segment having an end portion in contact with one of said push pins.

\* \* \* \* \*